May 5, 1925.
B. R. WEBSTER
ELECTRIC CONDENSER
Filed April 28, 1924
1,536,954
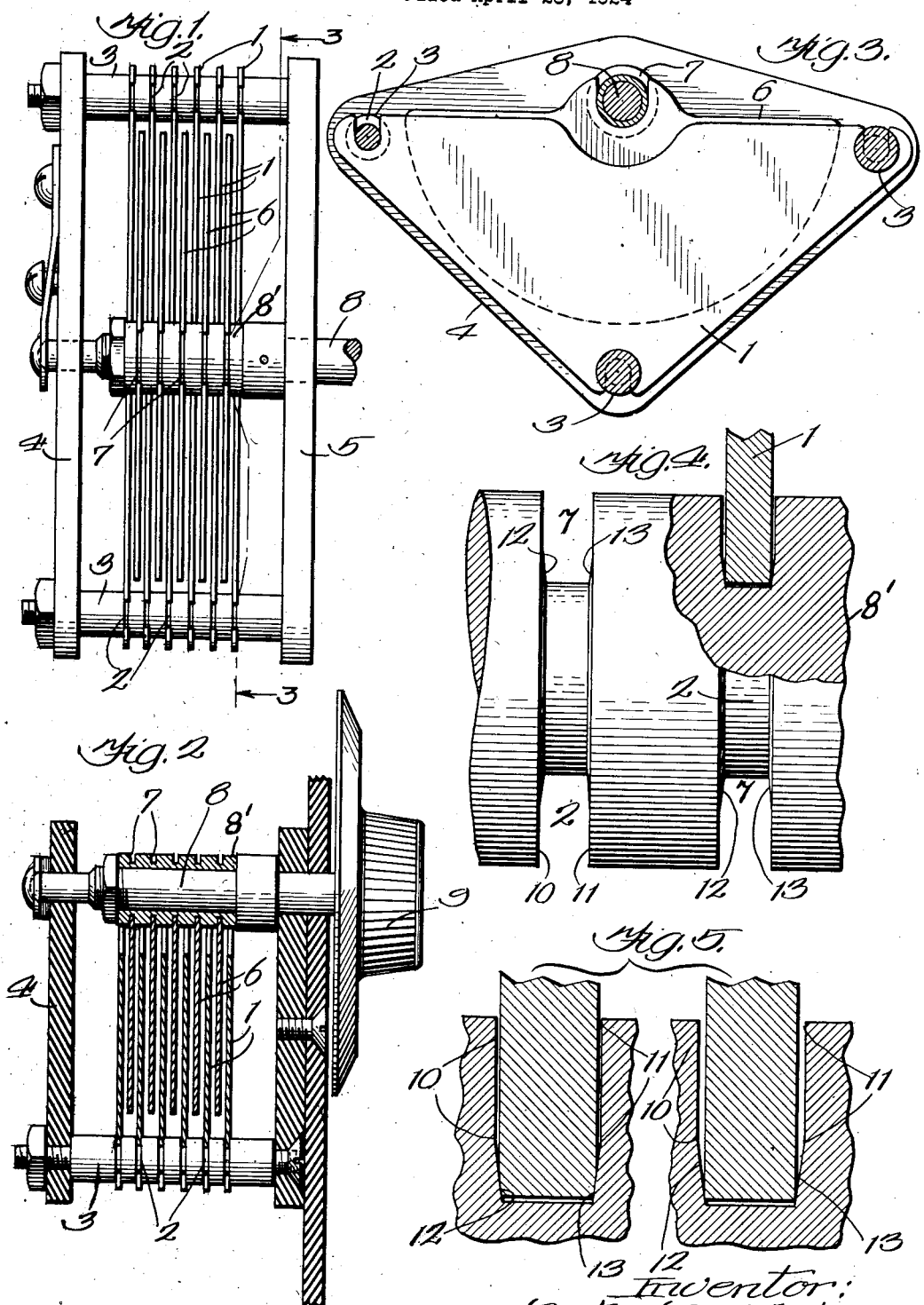

Patented May 5, 1925.

1,536,954

UNITED STATES PATENT OFFICE.

BESTER R. WEBSTER, OF CHICAGO, ILLINOIS, ASSIGNOR TO RELIANCE DIE & STAMPING COMPANY, OF CHICAGO, ILLINOIS, A CORPORATION OF ILLINOIS.

ELECTRIC CONDENSER.

Application filed April 28, 1924. Serial No. 709,515.

*To all whom it may concern:*

Be it known that I, BESTER R. WEBSTER, a citizen of the United States, residing at Chicago, in the county of Cook and the State of Illinois, have invented a certain new and useful Improvement in Electric Condensers, of which the following is a full, clear, concise, and exact description.

My invention relates to electric condensers whose sides are constructed of plates which are received in retaining grooves milled in their supports.

Hitherto these grooves have been of uniform width throughout their depth.

As condenser plates vary slightly in thickness, it is difficult to hold them all tightly in the receiving grooves thus formed.

I overcome this defect by inwardly conveying the sides of each groove into which a condenser plate is cramped; the thicker plates being cramped more than the thinner ones in order that they may be all brought to the proper places, relatively.

The invention will be more fully explained in connection with the accompanying drawing in which—

Fig. 1 is a side elevation of a condenser whose plates are assembled in accordance with my invention;

Fig. 2 is an axial sectional view;

Fig. 3 is a view on line 3—3 of Fig. 1;

Fig. 4 is an enlarged view showing the construction of my invention; and

Fig. 5 is a view showing how similarly sized grooves receive and tightly hold plates of different thickness.

The condenser illustrated has one side in the form of a stator and the other side in the form of a rotor. The stator side of the condenser includes the condenser plates 1 received in the annular grooves 2 formed in the rods 3. These rods are assembled with the end plates 4 and 5 so as to space these end plates apart.

The rotor side of the condenser includes the plates 6 received in the annular grooves 7 formed in the sleeve 8' upon shaft 8. This shaft is journaled in the plates 4 and 5 so that the rotor may be turned, there being a dial knob 9 upon the front end of the shaft to aid in the proper adjusting movements of the rotor.

The receiving grooves in the rotor shaft are illustrated in detail in Fig. 4. The receiving grooves for the plates of both condenser sides are further illustrated in Fig. 5. Each such groove has its outer side portions 10, 11 substantially parallel, the inward continuations 12, 13 of the groove sides converging inwardly, each sloping inwardly toward the other. All plates are preferably received in the grooves to the same extent, the thicker plates being cramped at their supported edges more than the thinner ones, as indicated at the left and right of Fig. 5 respectively.

By means of my invention the plates of different thickness are not only received tightly in the grooves that are uniform in dimensions and shape, but the median planes of the plates are equally spaced, so that the danger of short circuiting and improper condenser action is avoided.

Having thus described my invention, I claim:—

1. An electric condenser whose sides are formed of plates and a plate support having a plate receiving groove whose sides inwardly converge.

2. An electric condenser whose sides are formed of plates and a plate support having a plate receiving groove, the outer portions of the sides of the groove being substantially parallel and the inwardly continuing portions of said sides inwardly converging.

3. An electric condenser whose sides are formed of plates and a plate support having a plate receiving groove, each of whose sides inwardly slopes toward the other.

4. An electric condenser whose sides are formed of plates and a plate support having a plate receiving groove, the outer portions of the sides of the groove being substantially parallel and the inwardly continuing portions of said sides inwardly sloping each toward the other.

In witness whereof, I hereunto subscribe my name.

BESTER R. WEBSTER.